United States Patent [19]
Meyer et al.

[11] Patent Number: 5,510,416
[45] Date of Patent: Apr. 23, 1996

[54] PUMPABLE DESICCATED MASTIC

[75] Inventors: Paul J. Meyer, New Brighton; Anne Spinks, Hugo, both of Minn.

[73] Assignee: H. B. Fuller Licensing & Financing, Inc., Arden Hills, Minn.

[21] Appl. No.: 31,602

[22] Filed: Mar. 15, 1993

[51] Int. Cl.$^6$ .................................................. C08L 23/00
[52] U.S. Cl. ........................................ 524/528; 156/107
[58] Field of Search ........................ 524/528; 52/171.3, 52/172, 788, 789, 790; 29/469.5, 530; 428/34; 156/107

[56] References Cited

U.S. PATENT DOCUMENTS

| | | | |
|---|---|---|---|
| 3,965,215 | 6/1976 | Lopez et al. | 525/319 |
| 4,045,401 | 8/1977 | Stenmark et al. | 525/197 |
| 4,109,431 | 8/1978 | Mazzoni et al. | 52/172 |
| 4,197,381 | 4/1980 | Alia | 525/222 |
| 4,198,254 | 4/1980 | Laroche et al. | 156/107 |
| 4,226,063 | 10/1980 | Chenel | 52/172 |
| 4,431,691 | 2/1984 | Greenlee | 428/34 |
| 4,622,249 | 11/1986 | Bowser | 428/34 |

FOREIGN PATENT DOCUMENTS 0475213   3/1992   European Pat. Off.

OTHER PUBLICATIONS

ASTM, E 773-88, "Standard Test Methods for Seal Durability of Sealed Insulating Glass Units".
Popular Science, Aug., 1992, "Closing the Gaps in Window Efficiency", By Alex Wilson.
Edgetech, A Division of Lauren, Technical Report, "Super Spacer" By Michael Glover and Gerhard Reichert, Sep., 1989.

*Primary Examiner*—Peter D. Mulcahy
*Attorney, Agent, or Firm*—Vidas, Arrett & Steinkraus

[57] ABSTRACT

A novel, pumpable, thermoplastic desiccated mastic capable of desiccating a sealed insulating glass unit. The compositions utilize adhesive materials which have a low vapor transmission rate but, nevertheless, have been found to effectively dry the air space in the unit. They do not contribute to chemical fogging and, in preferred embodiments, reduce or eliminate chemical fogging caused by other structures in the assembly. The compositions adhere well to the U-channel material and do not flow or sag under the normal range of service conditions encountered by an insulating glass assembly.

The disclosed compositions comprise:

4–30 weight percent of a film former selected from the group consisting of polyisobutylene polymers having a molecular weight in the range of about 35,000 to about 60,000, and mixtures of such polymers with minor amounts of a butyl rubber having a molecular weight of up to about 500,000;

20–50 weight % of a non-crystalline homopolymer, copolymer, terpolymer or graft copolymer comprising polypropylene;

0–20 weight % of a low volatile UV stable tackifier compatible with the film former and polypropylene components; and 20–50 weight % of an adsorbent component comprising 20–50% by weight of the composition of a moisture or moisture and volatile organic chemical adsorbing material, and 0–10% by weight of the composition of an adsorbent of volatile organic compounds.

31 Claims, 1 Drawing Sheet

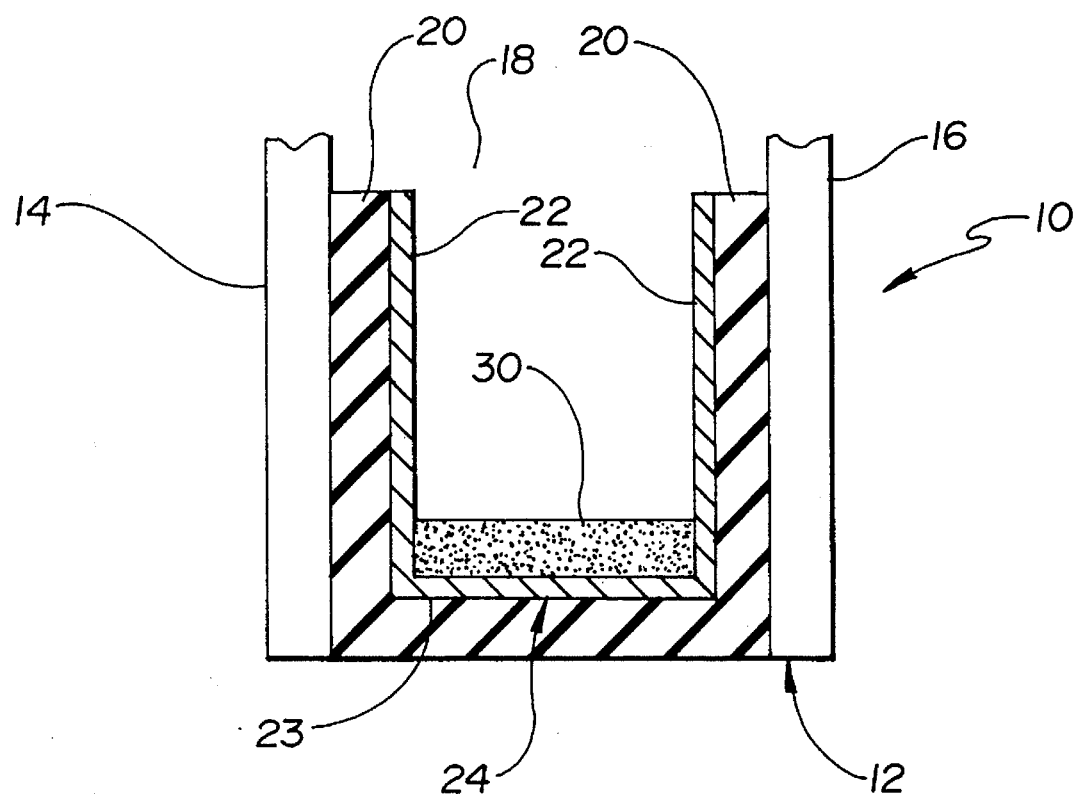

PUMPABLE DESICCATED MASTIC

BACKGROUND OF THE INVENTION

In recent years, much work has been done to design spacers for insulating glass units. Metal spacers between opposing panes can conduct heat efficiently so that the insulating performance is substantially reduced. Several alternative spacer designs have been described in *Popular Science*, August 1992 at page 46. Another alternative spacer design which has been developed to provide a highly desirable combination of structural integrity, moisture and gas impermeability and thermal efficiency is described in EP 475,213. This spacer utilizes a metal U-channel separated from the glass panels and the exterior edge of the assembly by a thermal brake. The U-channel opens to the interior of the assembly and includes a moisture permeable adhesive having a desiccant therein on the inner bottom surface of the channel. Adhesive materials having a permeability of greater than 2 gm mm/M$^2$ day as determined by ASTM F-372-73 is recommended. The desiccant loaded adhesive material contemplated for use in the invention has been a polyurethane-based formulation which is formed into a soft string and applied to the U-channel.

It would be an advantage to have a pumpable desiccant loaded formulation which could be more easily applied to the U-channel of the EP 475,213 reference and which would effectively desiccate the insulating glass assembly over its useful life.

Insulating glass assemblies can be subject to accumulation of unsightly chemical "fog" on the interior surface of the glass panels. Fogging can be caused by off-gassing of organic materials in the spacer or from other structures in the interior of the insulating glass assembly such as painted decorative grids. Off-gassing can be caused, for instance, by incompletely dry coatings on such grids or by UV or thermally induced degradation of a polymer during the service life of the insulating glass assembly. Any desiccant loaded material which is utilized in the U-channel of EP 475,213 should not contribute to chemical fogging and, desirably, should effectively adsorb organics originating from other structures within the insulating glass assembly so as to reduce chemical fogging.

The desiccant containing adhesive material utilized in the U-channel structure described in EP 475,213 must also be able to withstand elevated temperature without sagging or creeping and must maintain adhesion to the channel during the service life of the unit. Because the U-channel is open, any sagging, creeping or peeling of the desiccant composition will be readily visible.

These numerous requirements severely limit the options available for formulating a pumpable desiccant loaded material suitable for use in spacer structures of the type disclosed in EP 475,213.

SUMMARY OF THE INVENTION

The inventors of the subject matter of this application have developed a novel, pumpable, thermoplastic desiccated mastic capable of desiccating a sealed insulating unit of the type disclosed in EP 475,213. The compositions of the invention utilize adhesive materials which have a significantly lower vapor transmission rate than specified in the aforementioned EP reference, but, nevertheless, have been found to effectively dry the air space in the unit. They do not contribute to chemical fogging and, in preferred embodiments, reduce or eliminate chemical fogging caused by other structures in the assembly. The compositions adhere well to the U-channel material and do not flow or sag under the normal range of service conditions encountered by an insulating glass assembly.

The compositions of the invention comprise:
- 4–30 weight percent of a film former selected from the group consisting of polyisobutylene polymers having a molecular weight in the range of about 35,000 to about 60,000, and mixtures of such polymers with minor amounts of a butyl rubber having a molecular weight of up to about 500,000;
- 20–50 weight % of a non-crystalline homopolymer, copolymer, terpolymer or graft copolymer comprising polypropylene;
- 0–20 weight % of a low volatile UV stable tackifier compatible with the film former and polypropylene components; and
- 20–50 weight % of an adsorbent component comprising 20–50% by weight of the composition of a moisture or moisture and volatile organic chemical adsorbing material, and 0–10% by weight of the composition of an adsorbent of volatile organic compounds.

Insulating glass units prepared with the desiccating mastic of the invention and methods of manufacturing edge assemblies for insulating glass units by pumping heated formulations of the invention onto the edge assembly comprise further aspects of the invention disclosed herein.

DESCRIPTION OF THE FIGURE

FIG. 1 is a sectional view of the edge assembly of an insulating unit employing a pumpable mastic desiccant of the invention.

DETAILED DESCRIPTION OF THE INVENTION

Referring to the figure there is shown in FIG. 1 an insulating unit 10, having edge assembly 12 which serves to space the glass sheets 14 and 16 to provide the compartment 18. The edge assembly 12 includes a moisture and/or gas impervious adhesive type sealant layer 20 to adhere the glass sheets 14 and 16 to legs 22, 23 of metal spacer 24. A thin layer of a desiccating formulation 30 of the invention is applied on the inner surface of leg 23 of metal spacer 24 to adsorb moisture in the compartment 18.

As used herein, a composition is considered "pumpable" if, when tested per ASTM D-1238, Procedure B using a 1100 gram load and an 8 gram sample at 190° C. (374° F.), the melt flow time of the composition is no more than 60 seconds. Actual pumping temperatures are considerably lower, typically about 88°–121° C. (190°–250° F.), preferably about 110° C. (230° F.), but this melt flow test is considered to be a good predictor of pumpability with conventional industrial hot melt applicators. Preferably the melt flow time is no more than 15 sec. under the specified conditions.

To assure that the formulation will stay in place under normal service conditions the compositions should, at minimum show no visible sag or flow when installed in the insulating glass assembly and maintained at a temperature of at least 60° C. (140° F.) for a continuous period of at least 2 weeks. Preferably the formulation will withstand at least 70° C. (158° F.) for at least 1 month.

THE FILM FORMER

The film former component used in the invention provides low temperature flexibility. Butyl rubbers used alone, and high molecular weight isobutylene polymers are unsuitable because they do not allow sufficient desiccant to be added to the formulation before the mastic becomes unpumpable. Polybutene rubbers have poor UV properties, and therefore are also unsuitable for use in the present invention. Polyisobutylene polymers having a molecular weight range of about 35,000–60,000, when used alone or in combination with a minor amount of a butyl rubber provides a suitable combination of UV resistance, good low temperature flexibility and pumpability at practical application temperatures (typically 80°–115 ° C.). If used, the butyl rubber should be limited to an amount no more than 50% of the film former component. Preferably the polyisobutylene polymer is used as the sole film former ingredient.

Preferably the isobutylene polymer has a molecular weight of about 50–56,000. A suitable product is Vistanex™ LM-MH, sold by Exxon. A suitable butyl rubber, if used, is Butyl 268, sold by Exxon.

PROPYLENE POLYMER

The propylene polymer functions to give the formulation the cohesive strength and heat resistance necessary for use as a desiccating material in an open U-channel insulating glass assembly of the type shown in FIG. 1. It must have a low volatiles content, be compatible with a film former and must be non-crystalline. Various propylene polymers are suitable such as the Rextac® APO series polymers including Rextac® 2100 series homopolymers, 2500 series ethylene-propylene copolymers and 2700 series butene-propylene copolymers and terpolymers. These products typically have a number average molecular weight ($M_n$) in the range of about 7,000–14,000; weight average molecular weight ($M_w$) in the range of about 35,000–90,000; Z average ($M_z$) in the range of about 13,000–33,000 and polydispersity (MWD) in the range of about 4.9–6.2. Other polymers which may be used are sold under the trademark Eastoflex by Eastman Chemical, such as Eastoflex T1035, a propylene-ethylene-butene terpolymer having a $M_n$ of about 4,000 and a $M_w$ of about 16,000, and K-Tac® A-1,000 amorphous polypropylene sold by Baychem.

TACKIFYING RESINS

The use of a tackifying resin is preferably avoided entirely. It has been found that most tackifiers, even when extensively vacuum stripped, can contribute substantially to chemical fogging. Many tackifiers are also incompatible with the film former/polymer combination used in the invention. In the preferred formulations of the invention, good adhesion to the substrate can be obtained without use of any tackifier. If a tackifying resin is used, it is preferably one which has good UV resistance, low volatiles, and is compatible in the formulation. Hydrogenated wood rosin, such as Foral 105 sold by Hercules, or hydrocarbon tackifying resins, such as Regal Rez 1094 hydrogenated hydrocarbon tackifying resin and Exxon ECR 165C $C_5/C_9$ tackifying resin, are recommended if a tackifier is employed.

ADSORBENT

The adsorbent may be one or more of the known moisture adsorbing materials, alone or in combination with adsorbents of low molecular weight organics, such as natural zeolite (e.g. chabasite, gumerinite, levynite, erinite, mordenite and analcite), molecular sieves, silica gel, silica-magnesia gel, silica-alumina gel, activated carbon, activated alumina, etc. At least 20% by weight of the composition is a moisture adsorbing desiccant. As a practical matter the maximum adsorbent content is about 50%. Levels much higher than 50% give unpumpable formulations. Preferably the desiccant content is between about 30 and 50% by weight of the composition. Suitably, the composition also includes up to about 10%, preferably 8–10%, of an adsorbent of volatile organics. An adsorbent component which functions to remove both moisture and volatile organics, such as molecular sieve 13x, may also be employed as part or all of the adsorbent component of the formulation. A preferred component is a mixture of about 20–40% by weight of a desiccant such as molecular sieve 3A and 8–10% by weight of the composition of a desiccant/organic vapor adsorbent, such as molecular sieve 13x. Desirably the desiccant and chemical adsorbent components are in the form of a powder of 50–100 mesh or less.

OTHER ADDITIVES

The formulation may include other common additives such as fillers, antioxidants, UV and thermal stabilizers, adhesion promoters and the like, provided that they do not substantially interfere with the performance of the formulation for its desired purpose. In particular, optional fillers should not increase viscosity of a mastic beyond that practical for pumpability and all other additives must be sufficiently non-volatile to withstand devolatilization of the formulated composition. A suitable extending filler is a calcium carbonate filler, such as Hubercarb™ Q-325 sold by J. M. Huber, which may be employed at levels up to about 10% by weight of the composition, preferably about 5% or less.

PROCESSING

The formulation is suitably made by heating and mixing all components at an elevated temperature, typically 121°–140° C. (250°–284° F.), until a smooth and uniform mixture has been obtained. Higher temperatures may be required when butyl rubber is incorporated into the composition. Devolatilization of the heated formulation may be accomplished before or after addition of the adsorbent. When the adsorbent includes a chemical adsorbent as well as a desiccant, it is desirable that the mixture be devolatilized first, before addition of the adsorbent components. Suitably, the mixture is heated to about 150° C. (302° F.), evacuated to a vacuum pressure of less than 571.8 mm Hg (22 inches Hg) for at least 30 minutes, after which the adsorbent is added and the formulation then subjected to a second stage devolatilization of at least the same extent. The formulated mastic may ben be filtered directly into dry containers which are sealed until use.

The invention is illustrated by reference to the following non-limiting examples.

EXAMPLES

Devolatilized formulations were prepared from the following ingredients:

| Components | Comparative Examples | | | Invention Example |
|---|---|---|---|---|
| | A | B | C | |
| Butyl rubber ($M_w$-450,000) | 20.0 | 15.0 | 15.0 | |
| Polyisobutylene ($M_w$ 53,000) | | | 10.0 | 5.0 |
| Ethylene-propylene copolymer Rextac ® RT 2535 | 30.0 | | | |
| Amorphous polypropylene K-Tac ™ A100 | | 25.0 | | |
| Butene-ethylene-propylene terpolymer ($M_w$-16,000) | | | 24.0 | 44.0 |
| Hydrogenated wood rosin | 4.5 | 9.0 | | |
| Ethylene-vinyl acetate copolymer Elvax ™ 410 | | 5.0 | | |
| Molecular sieve type 3-A | 45.0 | 45.0 | 40.0 | 40.0 |
| Molecular sieve type 13x | | | 10.0 | 10.0 |
| Antioxidant | 0.49 | 0.5 | 0.5 | 0.5 |
| Carbon Black | 0.01 | 0.5 | 0.5 | 0.5 |

Comparative formulations A and C had unacceptably high melt flow properties of more than 60 sec. at 374° F. using a 1100 gram load and an gram sample size, when tested per ASTM D-1238, Procedure B. Comparative example B had a satisfactory melt flow but chemical fogging occurred when the formulation was tested in a sealed insulating glass unit per ASTM E-773, using the pass/fail specification of ASTM E-774. The invention example had very good melt flow of 5–10 sec. under the same test conditions and also did not cause fogging when tested per ASTM E-773.

The formulation of the invention was then tested for ability to dry an insulating glass unit by frost point determination. The frost point is the temperature at which condensation occurs within the sealed unit. The test method used conformed to ASTM E-546. The results are compared to a control assembled without a desiccating formulation. Results are given below:

| TIME | CONTROL | INVENTION EXAMPLE |
|---|---|---|
| 0 | 6–7° F. | 0 to 2° F. |
| 15 min. | 6–7° F. | –2 to 0° F. |
| 30 min. | 6–7° F. | –6 to –4° F. |
| 60 min. | 6–7° F. | –10 to –8° F. |

The lowering of the frost point over time with the formulation of the invention demonstrates that the formulation was effectively removing moisture from the air space of the test panel.

What is claimed is:

1. A pumpable thermoplastic hot melt mastic composition comprising:

4–30 weight percent of the composition of a film former selected from the group consisting of polyisobutylene polymers having a weight average molecular weight in the range of about 35,000 to about 60,000, and mixtures of such polymers with minor amounts of a butyl rubber having a weight average molecular weight of up to about 500,000;

20–50 weight % of the composition of a non-crystalline homopolymer, copolymer, terpolymer or graft copolymer comprising polypropylene;

0–20 weight % of the composition of a low volatile UV stable tackifier compatible with the film former and polypropylene components; and 20 to about 50 weight % of the composition of an adsorbent component comprising 20 to about 50% by weight of the composition of a moisture or moisture and volatile organic chemical adsorbing material, and 0–10% by weight of the composition of an adsorbent of volatile organic compounds, the composition, when tested as set forth in ASTM D-1238, Procedure B using a 1100 gram load and an 8 gram sample at 190° C., having a melt flow time of no more than 60 seconds.

2. A composition as in claim 1 free of a tackifier.

3. A composition as in claim 1 wherein the film former consists of a said polyisobutylene polymer.

4. A composition as in claim 3 wherein the polyisobutylene polymer has a weight average molecular weight of about 50,000–56,000.

5. A composition as in claim 1 wherein the propylene polymer is selected from the group consisting of amorphous propylene homopolymers, ethylene-propylene copolymers and butene-propylene copolymers and terpolymers.

6. A composition as in claim 5 wherein the propylene polymer is a propylene-ethylene-butene terpolymer.

7. A composition as in claim 5 wherein the propylene polymer is one having a number average molecular weight of about 4000–7000 and a weight average molecular weight of about 16,000 to about 90,000.

8. A composition as in claim 1 wherein the adsorbent is a mixture of desiccant and volatile organic chemical adsorbing materials.

9. A composition as in claim 8 wherein the adsorbent comprises 20–40% by weight of the composition of molecular sieve 3A and 8–10% by weight of the composition of molecular sieve 13x.

10. A composition as in claim 9 wherein the adsorbent is in the form of a powder of 100 mesh or less.

11. A composition as in claim 1 further comprising a filler in an amount of 10% or less of the composition.

12. A composition as in claim 11 wherein the filler is calcium carbonate and is present at a level of 5% or less of the composition.

13. A composition as in claim 1 wherein the formulation when installed in art insulating glass unit and maintained at a temperature of at least 60° C. for 2 weeks shows no visible sag or flow.

14. A composition as in claim 13 characterized by a melt flow time at 190° C. of no more than 15 seconds.

15. A composition as in claim 1 wherein said melt flow time at 190° C. is no more than 15 seconds.

16. A hot melt mastic composition, the composition being thermoplastic and being pumpable, whereby when tested as set forth in ASTM D-1238, Procedure B using a 1100 gram load and an 8 gram sample at 190° C., a melt flow time of no more than 60 seconds is obtained, the composition comprising:

a resin component consisting essentially of:
      4–30 parts by weight of the resin component of a film former selected from the group consisting of polyisobutylene polymers having a weight average molecular weight in the range of about 35,000 to about 60,000, and mixtures of such polymers with minor amounts of a butyl rubber having a weight average molecular weight of up to about 500,000;
      20–50 parts by weight of the resin component of a non-crystalline homopolymer, copolymer, terpolymer or graft copolymer comprising polypropylene; and, 0–20 parts by weight of the resin component of a low volatile UV stable tackifier compatible with the film former and polypropylene components; and an adsorbent component comprising:

at least 20% by weight of the composition of a moisture or moisture and volatile organic chemical adsorbing material; and 0–10% by weight of the composition of an adsorbent of volatile organic compounds, said adsorbent component being present in an amount less than the level which will render the composition unpumpable whereby when tested as set forth in ASTM D-1238, Procedure B using a 1100 gram load and an 8 gram sample at 190° C. a melt flow time of more than 60 seconds would be obtained.

17. A composition as in claim 16 wherein said melt flow time is no more than 15 seconds.

18. A composition as in claim 16 wherein the adsorbent component is a mixture of desiccant and volatile organic chemical adsorbing materials.

19. A composition as in claim 16 further comprising a filler in an amount of 10% or less of the composition.

20. A composition as in claim 16 wherein the composition when installed in an insulating glass unit and maintained at a temperature of at least 60° C. for 2 weeks shows no visible sag or flow.

21. A composition as in claim 16 further comprising a filler in an amount of 10% of the composition or less.

22. A composition as in claim 16 wherein said adsorbent component comprises a desiccant in an amount of at least 30% of the composition.

23. A composition as in claim 22 wherein said desiccant is present in an amount of about 50% of the composition.

24. A composition as in claim 16 wherein said adsorbent component comprises a desiccant in an amount of about 30% to about 50% of the composition.

25. A composition as in claim 24 wherein said adsorbent component further comprises an adsorbent of volatile organic chemicals in an amount of up to about 10% of the composition.

26. A composition as in claim 25 wherein said adsorbent of volatile organic chemicals is present in an amount of 8–10% of the composition.

27. A composition as in claim 16 consisting essentially of said resin component and said adsorbent component.

28. A composition as in claim 27 wherein said adsorbent component comprises a desiccant in an amount of at least 30% of the composition.

29. A composition as in claim 27 wherein said adsorbent component comprises a desiccant in an amount of about 30% to about 50% of the composition.

30. A composition as in claim 29 wherein said adsorbent component further comprises an adsorbent of volatile organic chemicals in an amount of up to about 10% of the composition.

31. A composition as in claim 30 wherein said adsorbent of volatile organic chemicals is present in an amount of 8–10% of the composition.

* * * * *

UNITED STATES PATENT AND TRADEMARK OFFICE
CERTIFICATE OF CORRECTION

PATENT NO. : 5,510,416

DATED : April 23, 1996

INVENTOR(S) : Paul Meyer et al

It is certified that error appears in the above-identified patent and that said Letters Patent is hereby corrected as shown below:

Col. 6, line 45, delete "art" and insert -- an --

Signed and Sealed this

Sixteenth Day of July, 1996

*Attest:*

BRUCE LEHMAN

*Attesting Officer*     *Commissioner of Patents and Trademarks*